US009537775B2

(12) United States Patent
McMurry et al.

(10) Patent No.: US 9,537,775 B2
(45) Date of Patent: Jan. 3, 2017

(54) METHODS, SYSTEMS, AND COMPUTER READABLE MEDIA FOR DIAMETER LOAD AND OVERLOAD INFORMATION AND VIRTUALIZATION

(71) Applicant: Oracle International Corporation, Redwood Shores, CA (US)

(72) Inventors: Sam Eric McMurry, Richardson, TX (US); Ben Allen Campbell, Irving, TX (US); Robert James Sparks, Plano, TX (US)

(73) Assignee: Oracle International Corporation, Redwood Shores, CA (US)

( * ) Notice: Subject to any disclaimer, the term of this patent is extended or adjusted under 35 U.S.C. 154(b) by 59 days.

(21) Appl. No.: 14/034,478

(22) Filed: Sep. 23, 2013

(65) Prior Publication Data

US 2015/0085663 A1    Mar. 26, 2015

(51) Int. Cl.
| | |
|---|---|
| *H04J 1/16* | (2006.01) |
| *H04L 12/801* | (2013.01) |
| *H04L 12/24* | (2006.01) |
| *H04L 29/06* | (2006.01) |
| *H04L 29/08* | (2006.01) |
| *H04W 4/00* | (2009.01) |

(52) U.S. Cl.
CPC ......... *H04L 47/127* (2013.01); *H04L 41/5025* (2013.01); *H04L 63/0892* (2013.01); *H04L 67/1002* (2013.01); *H04W 4/003* (2013.01)

(58) Field of Classification Search
CPC ...... H04L 63/08; H04L 63/0892; H04L 69/40; H04L 49/50; H04L 49/501

USPC .......................................................... 370/236
See application file for complete search history.

(56) References Cited

U.S. PATENT DOCUMENTS

| | | | |
|---|---|---|---|
| 5,228,083 | A | 7/1993 | Lozowick et al. |
| 6,505,244 | B1 | 1/2003 | Natarajan et al. |
| 6,795,546 | B2 | 9/2004 | Delaney et al. |
| 6,967,956 | B1 | 11/2005 | Tinsley et al. |
| 7,042,877 | B2 | 5/2006 | Foster et al. |
| 7,043,000 | B2 | 5/2006 | Delaney et al. |

(Continued)

FOREIGN PATENT DOCUMENTS

| | | |
|---|---|---|
| CN | 1809072 A | 7/2006 |
| CN | 101252788 A1 | 8/2008 |

(Continued)

OTHER PUBLICATIONS

Fajardo et al., "Diameter Base Protocol," RFC 6733, pp. 1-152 (Oct. 2012).

(Continued)

*Primary Examiner* — Kan Yuen
(74) *Attorney, Agent, or Firm* — Jenkins, Wilson, Taylor & Hunt, P.A.

(57) ABSTRACT

Methods, systems, and computer readable media for managing Diameter overload information within a telecommunications network are disclosed. One embodiment of a system for implementing the subject matter described herein includes at a virtualization orchestrator (VO) having a hardware processor and within the telecommunications network, receiving overload information, determining a network virtualization operation to perform based on the received information, and performing the network virtualization operation.

19 Claims, 4 Drawing Sheets

(56) References Cited

U.S. PATENT DOCUMENTS

| | | |
|---|---|---|
| 7,286,516 B2 | 10/2007 | Delaney et al. |
| 7,383,298 B2 | 6/2008 | Palmer et al. |
| 7,403,537 B2 | 7/2008 | Allison et al. |
| 7,466,807 B2 | 12/2008 | McCann et al. |
| 7,522,517 B1 | 4/2009 | Johnson |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,792,981 B2 | 9/2010 | Taylor |
| 7,916,685 B2 | 3/2011 | Schaedler et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,045,983 B2 | 10/2011 | Bantukul |
| 8,170,035 B2 | 5/2012 | Furey et al. |
| 8,468,267 B2 | 6/2013 | Yigang et al. |
| 8,532,110 B2 | 9/2013 | McCann et al. |
| 8,601,073 B2 | 12/2013 | Craig et al. |
| 8,879,431 B2 | 11/2014 | Ridel et al. |
| 8,914,526 B1 | 12/2014 | Lindquist et al. |
| 9,106,769 B2 | 8/2015 | Kanode et al. |
| 9,240,949 B2 | 1/2016 | McMurry et al. |
| 9,298,515 B2 | 3/2016 | McMurry et al. |
| 9,369,386 B2 | 6/2016 | McMurry et al. |
| 9,369,390 B2 | 6/2016 | Bantukul et al. |
| 2002/0004827 A1 | 1/2002 | Ciscon et al. |
| 2002/0091810 A1 | 7/2002 | Hundscheidt et al. |
| 2003/0200277 A1 | 10/2003 | Kim |
| 2004/0199632 A1 | 10/2004 | Romero et al. |
| 2005/0002417 A1 | 1/2005 | Kelly et al. |
| 2005/0105464 A1 | 5/2005 | Acharya et al. |
| 2006/0045249 A1 | 3/2006 | Li et al. |
| 2006/0069776 A1 | 3/2006 | Shim et al. |
| 2006/0090004 A1 | 4/2006 | Nikolayev et al. |
| 2006/0268835 A1 | 11/2006 | Hyotylainen et al. |
| 2007/0083927 A1 | 4/2007 | Swaroop |
| 2007/0121596 A1 | 5/2007 | Kurapati et al. |
| 2007/0153995 A1 | 7/2007 | Fang et al. |
| 2008/0031258 A1 | 2/2008 | Acharya et al. |
| 2008/0167035 A1 | 7/2008 | Buckley et al. |
| 2008/0170497 A1 | 7/2008 | Jeong et al. |
| 2008/0198748 A1 | 8/2008 | Gilfix et al. |
| 2008/0250156 A1* | 10/2008 | Agarwal ............ H04L 47/10 709/235 |
| 2008/0253387 A1 | 10/2008 | Liang et al. |
| 2008/0301162 A1 | 12/2008 | Wall et al. |
| 2008/0317247 A1 | 12/2008 | Jeong et al. |
| 2009/0092131 A1 | 4/2009 | Hu et al. |
| 2009/0185494 A1 | 7/2009 | Li et al. |
| 2009/0232011 A1 | 9/2009 | Li et al. |
| 2009/0265467 A1 | 10/2009 | Peles |
| 2009/0327079 A1 | 12/2009 | Parker et al. |
| 2010/0030914 A1 | 2/2010 | Sparks et al. |
| 2010/0071035 A1 | 3/2010 | Budko et al. |
| 2010/0125477 A1 | 5/2010 | Mousseau et al. |
| 2010/0211956 A1 | 8/2010 | Gopisetty et al. |
| 2010/0217850 A1 | 8/2010 | Ferris |
| 2010/0220622 A1 | 9/2010 | Wei |
| 2010/0251330 A1 | 9/2010 | Kroeselberg et al. |
| 2010/0299451 A1 | 11/2010 | Yigang et al. |
| 2011/0016467 A1 | 1/2011 | Kane |
| 2011/0040845 A1 | 2/2011 | Cai et al. |
| 2011/0060830 A1 | 3/2011 | Kang et al. |
| 2011/0061061 A1* | 3/2011 | Chen et al. ............ 719/313 |
| 2011/0090900 A1 | 4/2011 | Jackson et al. |
| 2011/0116382 A1 | 5/2011 | McCann et al. |
| 2011/0171958 A1 | 7/2011 | Hua et al. |
| 2011/0199906 A1 | 8/2011 | Kanode et al. |
| 2011/0200053 A1 | 8/2011 | Kanode et al. |
| 2011/0202676 A1 | 8/2011 | Craig et al. |
| 2011/0299395 A1 | 12/2011 | Mariblanca Nieves |
| 2012/0036246 A1 | 2/2012 | Marsico |
| 2012/0044867 A1 | 2/2012 | Faccin et al. |
| 2012/0087368 A1 | 4/2012 | Kunarathnam et al. |
| 2012/0131165 A1 | 5/2012 | Baniel et al. |
| 2012/0155389 A1 | 6/2012 | McNamee et al. |
| 2012/0158994 A1 | 6/2012 | McNamee et al. |
| 2012/0203781 A1 | 8/2012 | Wakefield |
| 2012/0221445 A1 | 8/2012 | Sharma |
| 2012/0221693 A1 | 8/2012 | Cutler et al. |
| 2012/0303796 A1 | 11/2012 | Mo et al. |
| 2012/0307631 A1 | 12/2012 | Yang et al. |
| 2013/0003745 A1 | 1/2013 | Nishimura |
| 2013/0019277 A1 | 1/2013 | Chang et al. |
| 2013/0039176 A1 | 2/2013 | Kanode et al. |
| 2013/0064093 A1 | 3/2013 | Ridel et al. |
| 2013/0124712 A1* | 5/2013 | Parker .............................. 709/224 |
| 2013/0163429 A1 | 6/2013 | Dunstan et al. |
| 2013/0173810 A1 | 7/2013 | Subramaniam |
| 2013/0188489 A1 | 7/2013 | Sato |
| 2013/0198353 A1 | 8/2013 | Hua et al. |
| 2013/0223219 A1 | 8/2013 | Mir et al. |
| 2013/0227114 A1 | 8/2013 | Vasseur et al. |
| 2013/0250770 A1 | 9/2013 | Zou et al. |
| 2013/0263208 A1 | 10/2013 | Challa |
| 2013/0275583 A1 | 10/2013 | Roach et al. |
| 2014/0026231 A1 | 1/2014 | Barak et al. |
| 2014/0032651 A1 | 1/2014 | Singh et al. |
| 2014/0089495 A1 | 3/2014 | Akolkar et al. |
| 2014/0105140 A1 | 4/2014 | Guo |
| 2014/0172739 A1 | 6/2014 | Anderson et al. |
| 2014/0192646 A1 | 7/2014 | Mir et al. |
| 2014/0193154 A1 | 7/2014 | Graham et al. |
| 2014/0215076 A1 | 7/2014 | Grothues |
| 2014/0215077 A1 | 7/2014 | Soudan et al. |
| 2014/0233389 A1 | 8/2014 | Bantukul et al. |
| 2014/0237111 A1 | 8/2014 | McMurry et al. |
| 2014/0304415 A1 | 10/2014 | Prakash et al. |
| 2014/0304416 A1 | 10/2014 | Khasnabish |
| 2014/0310388 A1 | 10/2014 | Djukic et al. |
| 2014/0376380 A1 | 12/2014 | Campbell et al. |
| 2015/0036486 A1 | 2/2015 | McMurry et al. |
| 2015/0036504 A1 | 2/2015 | McMurry et al. |
| 2015/0036505 A1 | 2/2015 | Sparks et al. |
| 2015/0046591 A1 | 2/2015 | Zhu et al. |
| 2015/0142940 A1 | 5/2015 | McMurry et al. |
| 2015/0149656 A1 | 5/2015 | McMurry et al. |
| 2015/0172115 A1 | 6/2015 | Nguyen et al. |
| 2015/0215167 A1 | 7/2015 | Donovan |
| 2015/0215228 A1 | 7/2015 | McMurry |

FOREIGN PATENT DOCUMENTS

| | | |
|---|---|---|
| CN | 2011 8 0008578.6 | 7/2015 |
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| JP | 2006-100873 | 4/2006 |
| KR | 10-2009-0029348 | 3/2009 |
| WO | WO 2008/087633 A2 | 7/2008 |
| WO | WO 2009/058067 A1 | 5/2009 |
| WO | WO 2009/070179 A1 | 6/2009 |
| WO | WO 2009/129487 A2 | 10/2009 |
| WO | WO 2009/134265 A1 | 11/2009 |
| WO | WO 2011/100626 A2 | 8/2011 |
| WO | WO 2011/161575 A1 | 12/2011 |
| WO | WO 2012/055446 A1 | 5/2012 |
| WO | WO 2012/100092 A2 | 7/2012 |
| WO | WO 2012/119147 A1 | 9/2012 |
| WO | WO 2012/130264 A1 | 10/2012 |
| WO | WO 2012/160465 A1 | 11/2012 |
| WO | WO 2013/155535 A1 | 10/2013 |
| WO | WO 2014/127346 A1 | 8/2014 |
| WO | WO 2014/127347 A1 | 8/2014 |
| WO | WO 2015/017422 A1 | 2/2015 |
| WO | WO 2015/077377 A1 | 5/2015 |

(56) References Cited

FOREIGN PATENT DOCUMENTS

| | | |
|---|---|---|
| WO | WO 2015/080906 A1 | 6/2015 |
| WO | WO 2015/116449 A1 | 8/2015 |

OTHER PUBLICATIONS

Letter regarding Notice of Grant for Chinese Patent Application No. 201180008578.6 (Jun. 4, 2015).

Letter regarding Office Action for Israel Patent Application No. 221425 (May 31, 2015).

Non-Final Office Action for U.S. Appl. No. 14/166,772 (Mar. 27, 2015).

Letter regarding Notice Before Examination for Israel Patent Application No. 221425 (Jan. 11, 2015).

Second Office Action for Chinese Patent Application No. 201180008578.6 (Dec. 9, 2014).

First Office Action for Chinese Application No. 201180008578.6 (May 8, 2014).

Notice of Allowance and Fee(s) Due for U.S. Appl. No. 13/026,144 (May 1, 2013).

Interview Summary for U.S. Appl. No. 13/026,144 (Mar. 4, 2013).

Jiao et al., "The Diameter Capabilities Update Application," RFC 6737, pp. 1-6 (Oct. 2012).

Fajardo et al., "Diameter Base Protocol," RFC 6733, pp. 1-6 (Oct. 2012).

Communication of European Publication Number and Information on the Application of Article 67(3) EPC for European Patent Application No. 11742921.7 (Sep. 12, 2012).

Notification of Transmittal of the International Search Report and the Written Opinion of the International Searching Authority, or the Declaration for International Application No. PCT/US2011/024642 (Oct. 28, 2011).

Traffix Systems, "Datasheet; Traffix Signaling Delivery Controller (SDC)," pp. 1-5 (May 2011).

Znaty, "Diameter, GPRS, (LTE + ePC = EPS), IMS, PCC and SDM," EFORT (May 2010). (Part 1 of 2, pp. 1-229).

Znaty, "Diameter, GPRS, (LTE + ePC = EPS), IMS, PCC and SDM," EFORT (May 2010). (Part 2 of 2, pp. 230-460).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

Tsou et al., "Realm-Based Redirection in Diameter," Internet Engineering Task Force, draft-ietf-dime-realm-based-redirect-02, pp. 1-7 (Oct. 27, 2009).

Bhardwaj, "Roaming Hubbing & LTE," GSMA London, pp. 1-11 (May 19, 2009).

Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).

Notification of Transmittal of the International Search Report and the Written Opinion of the International Searching Authority, or the Declaration for International Application No. PCT/US2014/066240 (May 13, 2015).

Non-Final Office Action for U.S. Appl. No. 13/956,304 (May 4, 2015).

Non-Final Office Action for U.S. Appl. No. 13/956,307 (Apr. 23, 2015).

Notice of Allowance and Fee(s) Due and Examiner-Initiated Interview Summary for U.S. Appl. No. 13/572,156 (Apr. 6, 2015).

Non-Final Office Action for U.S. Appl. No. 13/956,300 (Apr. 8, 2015).

Notification of Transmittal of the International Search Report and the Written Opinion of the International Searching Authority, or the Declaration for PCT International Application No. PCT/US2015/012250 (Mar. 31, 2015).

Non-Final Office Action for U.S. Appl. No. 13/863,351 (Mar. 27, 2015).

Notification of Transmittal of the International Search Report and the Written Opinion of the International Searching Authority, of the Declaration for International Application No. PCT/US2014/066469 (Feb. 20, 2015).

Communication of European publication number and information on the application of Article 67(3) EPC for European Application No. 13776083.1 (Jan. 21, 2015).

Commonly-assigned, co-pending International Application No. PCT/US15/12250 for "Methods, Systems, and Computer Readable Media for a Cloud-Based Virtualization Orchestrator," (Unpublished, filed Jan. 21, 2015).

Final Office Action for U.S. Appl. No. 13/572,156 (Dec. 29, 2014).

Notification of Transmittal of the International Search Report and the Written Opinion for the International Searching Authority, or the Declaration for International Application No. PCT/US2014/048651 (Nov. 17, 2014).

Notification of Transmittal of the International Search Report and the Written Opinion of the International Searching Authority, or the Declaration for International Application No. PCT/US2014/048644 (Oct. 17, 2014).

Notification of Transmittal of the International Search Report and the Written Opinion of the International Searching Authority, or the Declaration for International Application No. PCT/US2014/016853 (Jun. 6, 2014).

Notification of Transmittal of the International Search Report and the Written Opinion of the International Searching Authority, or the Declaration for International Application No. PCT/US2014/016860 (Jun. 4, 2014).

Commonly-assigned, co-pending U.S. Appl. No. 14/166,790 for "Methods, Systems, and Computer Readable Media for a Cloud-Based Virtualization Orchestrator," (Unpublished, filed Jan. 28, 2014).

"Network Function Virtualization (NFV) Management and Orchestration," ETSI, Group Specification, GS NFV-MAN 001 V0.0.11, pp. 1-74 (Oct. 18, 2013).

Tschofenig, "Diameter Overload Architecture and Information Model," draft-tschofenig-dime-overload-arch-00.txt, DIME, pp. 1-9 (Jul. 16, 2013).

Notification of Transmittal of the International Search Report and the Written Opinion of the International Searching Authority, or the Declaration for International Application No. PCT/US2013/036664 (Jul. 2, 2013).

Campbell, "Diameter Overload Control Solution Issues," draft-campbell-dime-overload-issues-00, pp. 1-16 (Jun. 2013).

"3rd Generation Partnership Project; Technical Specification Group Core Network and Terminals; Study on Diameter overload control mechanisms (Release 12)" 3GPP TR 29.809 V0.3.0, pp. 1-51 (Jun. 2013).

Roach et al., "A Mechanism for Diameter Overload Control," draft-roach-dime-overload-ctrl-03, DIME, pp. 1-49 (May 17, 2013).

Korhonen et al., "The Diameter Overload Control Application (DOCA)," draft-korhonen-dime-ovl-01.txt, Diameter Maintenance and Extensions (DIME), pp. 1-18 (Feb. 25, 2013).

Wendong et al., "Autonomicity Design in OpenFlow Based Software Defined Networking," GC'12 Workshop: The 4th IEEE International Workshop on Management of Emerging Networks and Services, pp. 818-823 (Dec. 3 2012).

"3rd Generation Partnership Project; Technical Specification Group Services and System Aspects; Policy and charging control architecture (Release 11)," 3GPP TS 23,203, V11.8.0 pp. 1-179 (Dec. 2012).

McMurry et al., "Diameter Overload Control Requirements," draft-ietf-dime-overload-reqs-00, pp. 1-25 (Sep. 21, 2012).

"Software-Defined Networking: The New Norm for Networks," ONF White Paper, Open Networking Foundation, pp. 1-12 (Apr. 13, 2012).

"Split Architecture for Large Scale Wide Area Networks," SPARC ICT-258457 Deliverable D3.3, pp. 1-129 (Dec. 1, 2011).

"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).

Interview Summary for U.S. Appl. No. 12/425,998 (Sep. 14, 2011).

(56) References Cited

OTHER PUBLICATIONS

Final Office Action for U.S. Appl. No. 12/425,998 (Jun. 8, 2011).
Interview Summary for U.S. Appl. No. 12/425,998 (Mar. 1, 2011).
Chapman et al., "Software architecture definition for on-demand cloud provisioning," Cluster Computing, vol. 15, No. 2, pp. 79-100 Feb. 27, 2011).
Non-Final Office Action for U.S. Appl. No. 12/425,998 (Nov. 29, 2010).
Notification of Transmittal of the International Search Report and the Written Opinion of the International Searching Authority, or the Declaration for International Application No. PCT/US2009/041006 (Dec. 4, 2009).
Dörnemann et al., "On-Demand Resource Provisioning for BPEL Workflows Using Amazon's Elastic Compute Cloud," 9th IEEE/ACM International Symposium on Cluster Computing and the Grid, pp. 140-147 (May 18, 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Hilt et al., "Session Initiation Protocol (SIP) Overload Control," IETF, draft-hilt-sipping-overload-02, p. 1-28 (Jul. 8, 2007).
Zhang et al., "Denial of Service Attack and Prevention on SIP VoIP Infrastructures Using DNS Flooding," in Principles, Systems, and Applications of IP Telecummunications (IPTCOMM) (Jul. 2007).
Nahum et al., "Evaluating SIP Server Performance," IBM T.J. Watson Research Center, RC24183 (Feb. 2007).
Rosenberg, "Requirements for Management of Overload in the Session Initiation Protocol," IETF, draft-rosenbergy-sipping-overload-reqs-02, p. 1-22 (Oct. 2006).
Kuthan et al., "Denial of Service Attacks Targeting a SIP VoIP Infrastructure: Attack Scenarios and Prevention mechanisms", IEEE Networks Magazine, vol. 20, No. 5 (Sep. 2006).
Ohta, "Overload Protection in a SIP Signaling Network," in International conference on Internet Surveillance and Protection (ICISP), p. 1-6 (2006).
Donovan et al., "Session Timers in the Session Initiation Protocol (SIP)," Network Working Group, RFC 4028 (Apr. 2005).
Ohta, "Simulation Study of SIP Signaling in an Overload Condition," International Conference for Communications, Internet, and Information Technology, IASTED/ACTA Press, pp. 321-326 (Nov. 22-24, 2004).
Calhoun et al., "Diameter Base Protocol," RFC 3588, pp. 1-147 (Sep. 2003).
Rosenberg et al., "SIP: Session Initiation Protocol," Network Working Group, RFC 3261, http://www.ietf.org/rfc/rfc3261.txt, p. 1-252 (Jun. 2002).
Schulzrinne et al., "SIPstone—Benchmarking SIP Server Performance," (Apr. 2002).
"Signaling Flows for the IP Multimedia Call control Based on Session Initiation Protocol (SIP) and Session Description Protocol (SDP)," 3GPP TS 24.228 V1.1.0, p. 1-653 (Jul. 3-6, 2001).
Grossglauser et al., "On the Relevance of Long-Range Dependence in Network Traffic," IEEE/ACM Transactions on Networking, vol. 7, No. 5, p. 629-640 (Oct. 1999).
Commonly-assigned, co-pending U.S. Appl. No. 14/692,710 for "Methods, Systems, and Computer Readable Media for Multi-Layer Orchestration in Software Defined Networks (SDNs)," (Unpublished, filed Apr. 21, 2015).
Non-Final Office Action for U.S. Appl. No. 14/086,950 (Dec. 4, 2015).
Supplemental Notice of Allowability for U.S. Appl. No. 13/956,300 (Dec. 1, 2015).
Supplemental Notice of Allowability for U.S. Appl. No. 14/182,800 (Dec. 1, 2015).
Advisory Action for U.S. Appl. No. 13/863,351 (Nov. 25, 2015).
Communication of European Publication Number and Information on the Application of Article 67(3) EPC for European Patent Application No. 14710682.7 (Nov. 25, 2015).
Notice of Allowance and Fee(s) Due for U.S. Appl. No. 14/182,800 (Nov. 10, 2015).
Final Office Action for U.S. Appl. No. 13/956,307 (Nov. 5, 2015).
Final Office Action for U.S. Appl. No. 13/956,304 (Nov. 3, 2015).
Notice of Allowance and Fee(s) Due & Examiner-Initiated Interview Summary for U.S. Appl. No. 13/956,300 (Oct. 23, 2015).
Non-Final Office Action for U.S. Appl. No. 14/092,898 (Oct. 8, 2015).
Non-Final Office Action for U.S. Appl. No. 14/182,864 (Sep. 23, 2015).
Final Office Action for U.S. Appl. No. 13/863,351 (Sep. 11, 2015).
Applicant-Initiated Interview Summary for U.S. Appl. No. 13/956,304 (Aug. 5, 2015).
Applicant-Initiated Interview Summary for U.S. Appl. No. 13/956,300 (Jun. 29, 2015).
Commonly-assigned, co-pending U.S. Appl. No. 14/720,412 for "Methods, Systems, and Computer Readable Media for Short and Long Term Policy and Charging Rules Function (PCRF) Load Balancing," (Unpublished, filed May 22, 2015).
"Multi-Protocol Routing Agent User Guide," Policy Management, 910-6648-001 Revision A, pp. 1-70 (Mar. 2013).
"Multi-Protocol Routing Agent User Guide," Policy Management, 910-6404-001 Revision A, pp. 1-70 (Jun. 2012).
Final Office Action for U.S. Appl. No. 14/166,722 (Oct. 7, 2015).
Applicant-Initiated Interview Summary for U.S. Appl. No. 13/863,351 (May 27, 2016).
Notice of Allowance and Fee(s) Due for U.S. Appl. No. 14/313,610 (May 20, 2016).
Communication of European Publication Number and Information on the Application of Article 67(3) EPC for European Patent Application No. 14755208.7 (May 11, 2016).
Applicant-Initiated Interview Summary for U.S. Appl. No. 14/313,610 (Apr. 26, 2016).
Applicant-Initiated Interview Summary for U.S. Appl. No. 14/166,790 (Apr. 14, 2016).
Non-Final Office Action for U.S. Appl. No. 13/863,351 (Mar. 17, 2016).
Notice of Allowance and Fee(s) Due for U.S. Appl. No. 13/956,304 (Mar. 16, 2016).
Notice of Allowance and Fee(s) Due for U.S. Appl. No. 14/182,864 (Feb. 17, 2016).
Notice of Allowance and Fee(s) Due and Examiner-Initiated Interview Summary for U.S. Appl. No. 13/956,307 (Feb. 12, 2016).
Non-Final Office Action for U.S. Appl. No. 14/166,790 (Feb. 2, 2016).
Applicant-Initiated Interview Summary for U.S. Appl. No. 13/956,304 (Feb. 1, 2016).
Applicant-Initiated Interview Summary for U.S. Appl. No. 14/092,898 (Jan. 14, 2016).
Non-Final Office Action for U.S. Appl. No. 14/313,610 (Jan. 11, 2016).
Applicant-Initiated Interview Summary for U.S. Appl. No. 14/182,864 (Dec. 16, 2015).
Extended European Search Report for European Application No. 13776083.1 (Dec. 14, 2015).
Non-Final Office Action for U.S. Appl. No. 14/166,772 (May 5, 2016).
Letter regarding Office Action for Israel Patent Application No. 221425 (Apr. 20, 2016).
Advisory Action Before the Filing of an Appeal Brief for U.S. Appl. No. 14/166,772 (Jan. 11, 2016).
Applicant-Initiated Interview Summary for U.S. Appl. No. 14/166,772 (Dec. 22, 2015).
Extended European Search Report for European Application No. 11742921.7 (Dec. 14, 2015).
Communication of European publication Number and information on the application of Article 67(3) EPC for European Patent Application No. 14755210.3 (Jul. 6, 2016).
Final Office Action for U.S. Appl. No. 14/086,950 (Jul. 1, 2016).
Letter Regarding Notice of Allowance for Israel Patent Application No. 2214525 (Jul. 10, 2016).

* cited by examiner

METHODS, SYSTEMS, AND COMPUTER READABLE MEDIA FOR DIAMETER LOAD AND OVERLOAD INFORMATION AND VIRTUALIZATION

TECHNICAL FIELD

The subject matter described herein relates to methods and systems for processing Diameter messages. More particularly, the subject matter described herein relates to methods, systems, and computer readable media for managing Diameter load and overload information within a telecommunications network.

BACKGROUND

Diameter is an authentication, authorization and accounting (AAA) protocol for computer networks, and is a successor to RADIUS. The Diameter base protocol is defined in International Engineering Task Force (IETF) request for comments (RFC) 6733 which is incorporated by reference herein in its entirety. Diameter messages use a per user framework and exist in the format of request-answer messages. Diameter answer messages travel back to the request source via the same path through which the request message was routed using hop-by-hop transport.

Diameter messages may be exchanged between Diameter nodes for performing various functions. For example, a mobility management entity (MME) and a home subscriber server (HSS) may interact for authentication, authorization, and/or accounting (AAA) purposes. The amount of Diameter messages exchanged between Diameter nodes may increase or decrease depending on various environmental and circumstantial conditions and scenarios. Overload can occur at a Diameter node when the amount of Diameter messages exchanged exceeds the processing capabilities of the node. When an overload has occurred, network resources such as processing and storage units may be allocated or relocated to accommodate the overload condition.

However, an overload condition may occur suddenly and/or unexpectedly due to unforeseeable circumstantial events. For example, a natural disaster such as an earth quake may occur without warning in a highly populated city such as Los Angeles or San Francisco. Naturally, cellular networks within these cities may suddenly be flooded with phone calls or text messages to family members, or pictures and videos to news agencies. This sudden onset of activity may overload networks or elements thereof, and causes the networks to get sluggish and possibly fail. Various network resources may be relocated manually to compensate the overload conditions, but such operations can be sometimes slow and redundant.

Accordingly, there exists a need for methods, systems, and computer readable media for managing Diameter load and overload information efficiently and quickly.

SUMMARY

According to one aspect, the subject matter described herein may include a method for using overload information for managing network virtualization. The method may include at a virtualization orchestrator comprising a hardware processor and for managing virtual networks within a telecommunications network receiving overload information, determining a network virtualization operation to perform based on the received information, and performing the network virtualization operation.

According to another aspect, the subject matter described herein comprises a system for using overload information for managing network virtualization. The system may include a virtualization orchestrator for managing virtual networks within a telecommunications network. Furthermore, the virtualization orchestrator may include a network interface for receiving overload information, and a rules engine for determining a network virtualization operation based on the received information and for performing the network virtualization operation.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

In context of telecommunications networks, the terms "load" and "overload" have somewhat overlapping meanings: for example, a node may be said to be "loaded" when its utilization is greater than 0% and less than an engineered capacity and "overloaded" when its utilization is greater than the engineered loading capacity. For example, a node that is part of a matched pair of nodes that provide the same function in a distributed manner may be considered "overloaded" if its utilization is greater than 50%, since the other 50% must be reserved for use in case the other node in the pair fails and causes the failing node's traffic to be handled by the remaining node. Similarly, if a node reports its utilization as being less than some overload threshold, such as message may be considered a "load indication", but if the node reports its utilization as being greater than the threshold, such a message may be considered an "overload indication". In other words, the difference between a "load message" and an "overload message" may be a matter of degree. For simplicity, the terms "load" and "overload" will be used synonymously herein unless explicitly stated otherwise. Thus, as used herein, the terms "load information" and "overload information" are synonymous and refer to information that indicates the load level, rate, throughput, or capacity at which a Diameter node or group of nodes are currently operating under.

BRIEF DESCRIPTION OF THE DRAWINGS

Preferred embodiments of the subject matter described herein will now be explained with reference to the accompanying drawings, where like reference numerals represent like parts, of which.

DETAILED DESCRIPTION

In accordance with the subject matter disclosed herein, systems, methods, and computer readable media are provided for managing Diameter load and overload information within a telecommunications network.

For example in some embodiments, it may be desirable for a telecommunications network virtualization orchestrators to utilize Diameter overload information generated by various Diameter nodes for more efficient network resource allocation. Diameter overload information may be extracted by Diameter nodes from Diameter messages. The Diameter nodes may then forward the overload information to be further processed by a virtualization orchestrator. In other embodiments, Diameter overload information may be supplied by external data sources such as an external network. For example, an external data collection network and/or a cloud network may be connected to the telecommunications network and supplying Diameter overload information to the virtualization orchestrator via an interface module. The virtualization orchestrator may utilize the overload information to generate network virtualization operation commands to network virtualization modules within the telecommunications network. The network virtualization modules can function accordingly to add or remove network resources to accommodate overload occurrences or a reduction in network load.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
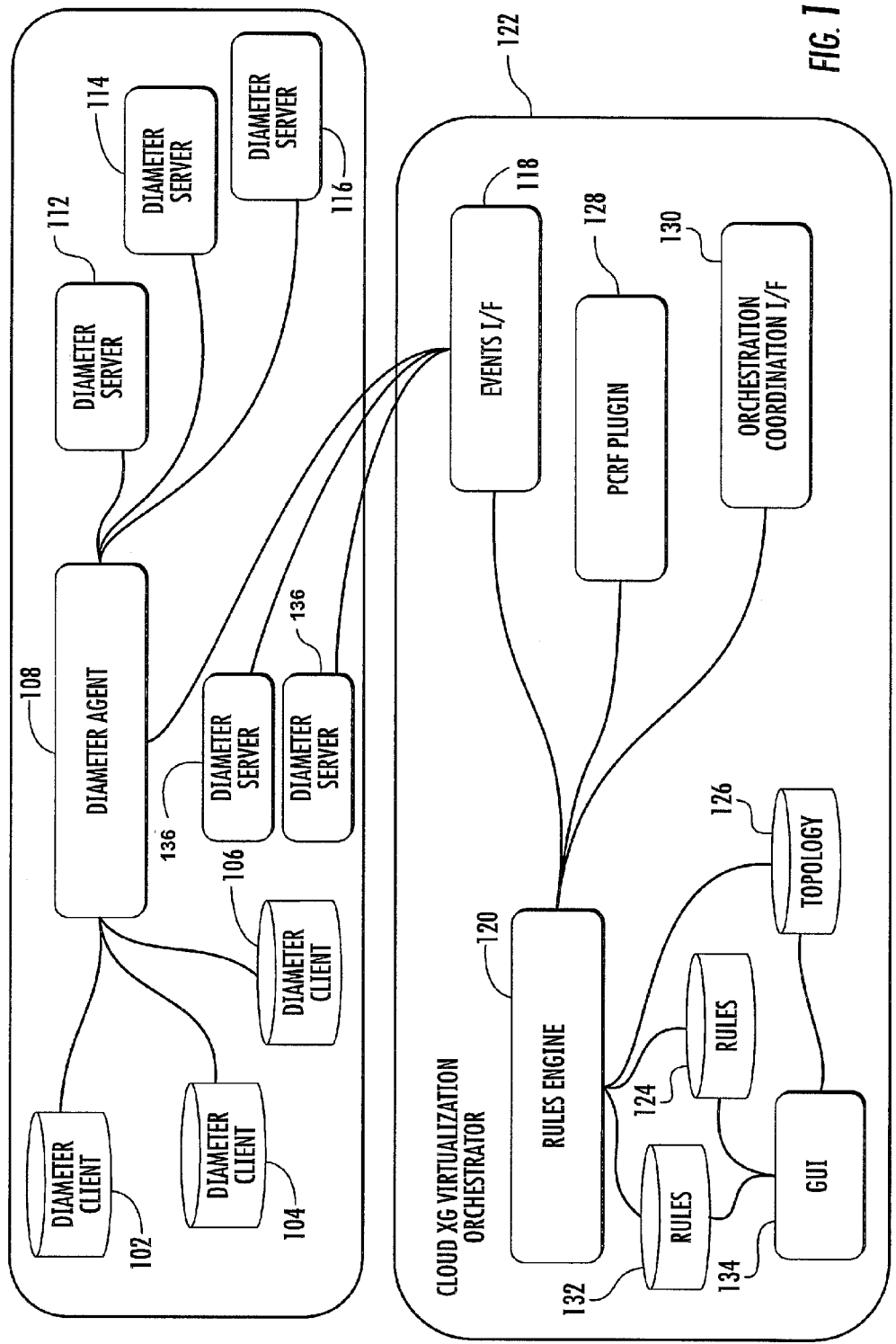
FIG. 1 is a diagram illustrating an exemplary embodiment of a system for using overload information for managing network virtualization according to an embodiment of the subject matter described herein.

FIG. 1 is a diagram illustrating an exemplary embodiment of a system for using overload information for managing network virtualization according to an embodiment of the subject matter described herein. Exemplary environment 100 may include one or more networks and may include one or more Diameter nodes, such as Diameter clients (DC) 102-106, a Diameter agent (DA) 108, Diameter servers (DS) 112-116, and a virtualization orchestrator 122 which may include a rules engine 120 and an events interface module 118.

Each of Diameter clients 102-106 may represent any suitable entity (e.g., a computing platform include at least one processor and memory) for requesting one or more services from Diameter servers 112-116. For example, Diameter client 102 may send a Diameter request message for requesting one or more services at an application hosted by Diameter server 112. Each of Diameter servers 112-116 may represent any suitable entity (e.g., a computing platform include at least one processor and memory) for providing or performing one or more services for Diameter clients 102-106. For example, Diameter server 112 may send a Diameter answer message (e.g. a Diameter response message) in response to receiving and processing a Diameter request message.

Exemplary Diameter clients 102-106 or Diameter servers 112-116 may include a mobility management entity (MME), a home subscriber server (HSS), an authentication, authorization, and accounting (AAA) server, a Bearer Binding and Event Reporting Function (BBERF), a serving gateway (SGW), a packet data network gateway (PDN GW), a charging data function (CDF), an online charging system, an offline charging system, a policy charging enforcement function (PCEF), a policy charging and rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a correlation node, a node, a database, a signaling gateway, a gateway, a monitoring node, a Diameter message processor, a data collection platform, a multi-protocol signaling gateway, a multi-protocol signaling router, or a computing platform.

DA 108 may be any suitable entity for performing Diameter overload control and/or related functions described herein. For example, DA 108 may be implemented on a computing platform with one or more processors and one or more network interfaces for receiving or transmitting messages. Examples of DA 108 may include, but are not limited to, a DSR, a DRN, a Diameter routing agent, a Diameter relay agent, a Diameter redirect agent, a Diameter translation agent, or a Diameter proxy agent.

In some embodiments, DA 108 may include functionality for receiving, processing and/or routing various messages (e.g., protocol data units (PDUs)) and may include various communications interfaces for communication with Diameter nodes, e.g., 3rd Generation Partnership Project (3GPP) LTE communications interfaces and other (e.g., non-LTE) communications interfaces. In some embodiments, receiving, processing, and/or routing functionality may be included in one or more modules. For example, DA 108 may include or have access to one or more modules for receiving Diameter signaling messages associated with multiple different Diameter signaling interfaces, e.g., S9, S6a, S11, Cx, and Dx.

Furthermore, DA 108 may receive Diameter messages via other Diameter interfaces. For example, DA 108 may receive Diameter messages via an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

In some embodiments, DA 108 may facilitate communication between Diameter clients 102-106 and Diameter servers 112-116. For example, Diameter client 102 may send a Diameter request message (e.g., a Diameter session establishment request message) to DA 108. The Diameter request message may require one or more services from Diameter servers 112. DA 108 may route, relay, and/or translate requests or responses between Diameter client 102 and a Diameter server 112. After receiving and processing the Diameter request message, Diameter server 112 may send a Diameter response message (e.g., a Diameter session establishment response message) to DA 108. The Diameter response message may be in response to a Diameter request message originated by Diameter client 102. DA 108 may provide the Diameter response message to Diameter client 102.

Furthermore, DA 108, or a module therein, may perform one or more functions prior to providing a Diameter message to another node. In some embodiments, the DA 108 may be configured to generate overload information from load information received from Diameter nodes. For example, load information may be stored in one or more attribute value pairs (AVPs) located in a payload portion of Diameter messages exchanged between multiple Diameter nodes. Load AVPs may contain any information for specifying load information or load metrics. Various algorithms may be used to generate load metrics, and some algorithms may generate load metrics that reflect utilization of resources. For example, load metrics may indicate a percentage of resources utilized or available at a Diameter node. In some embodiments, a load AVP may utilize an Unsigned32 data type format and may include a number between 0 and $2^{32}-1$ (4,294,967,295) for representing load, where 0 is "completely unloaded" and 4,294,967,295 is "maximum capacity".

The DA 108 may be configured to extract load information, such as the load AVP from the Diameter messages, and predict overload using the load information when load increases and/or spikes. Similarly, load information may also be examined to determine a rate of load increase, with a particular rate triggering some behavior. In some embodiments, overload conditions may be predicted in response to an increase in aggregate load up to and/or in excess of a predefined aggregate load. Signal processing can be applied to load information to detect complex patterns over time. In addition, the DA 108, or a module therein, may modify the Diameter message by inserting or including Diameter overload information or other related data in the modified Diameter message. For example, Diameter overload information may be stored in one or more AVPs located in a payload portion of the modified diameter message.

In some embodiments, DA 108 may direct the Diameter overload information to a cloud network virtualization orchestrator via any suitable mechanism, such as an events interface module. The exemplary mechanisms by which Diameter agent 108 communicates the Diameter overload information will be described in detail below with respect to FIG. 2.

While FIG. 1 depicts DA 108 communicating with (e.g., receiving Diameter messages from) various Diameter nodes, it will be appreciated that DA 108 may communicate with the nodes depicted and other nodes (not depicted) via additional and/or different interfaces. It will also be appreciated that DA 108 may include fewer, additional, or different modules and/or components.

In some embodiments, the Diameter agent 108 may direct the Diameter overload information to a virtualization orchestrator 122. For example, DA 108 may be connected to a rules engine 120 of a virtualization orchestrator 122 via interface modules, and a network message that includes Diameter overload information can be directed to the rules engine by the DA 108. In some embodiments, the DA 108 may be in communication with an events interface 118 module of the virtualization orchestrator 122. The events interface 118 may be configured to be a bi-directional interface module, supplying analytic data and network virtualization operation commands to the virtualization orchestrator 122, and direct messages such as network coordination commands back to the DA 108.

In some embodiments, the rules engine 120 may receive Diameter overload information from the DA 108 via the events interface module 118. The rules engine 120 may be connected to a rules database 132 which may stores a set of provision rules of the cloud network, a state database 124 which may monitor and store state information of the network, and a topology database 126 which may supply network topology data to the rules engine 120. In addition, the rules engine 120 may be connected to a Graphical User Interface (GUI) 130, which may be configured to supply network status to an end user.

In some embodiments, the rules engine 120 may be configured to process the received Diameter overload information. The rules engine 120 may apply network operation rules from the rules database 132, coupled with current network state data supplied by the state database 124 and status of the current network topology extracted from the topology database 126 to generate network virtualization operation commands to the telecommunications network. For example, when the Diameter overload information indicates that one or more Diameter nodes need a reduction in the number of service requests, the rules engine 120 may generate request commands to the telecommunications network to deploy additional resources to mitigate the effects of the overload. Similarly, the rules engine 120 may generate commands to direct the telecommunications network to make reduction in the deployed resources when the Diameter overload information indicates abatement in the network overload, or a reduction in load.

In some embodiments, the generated commands can be directed to various applications and products within the telecommunications network via an application coordination interface module. For example, the application coordination interface module may be a policy charging and rules function (PCRF) 128 module configured to interact with applications and products within the telecommunications network. The PCRF 128 plugin may be used to control topology and provisioning configuration to the various resources within the telecommunications network. In addition, the PCRF 128 plugin may be configured to be a bi-directional interface module and supply network performance indicators such as processor and disk usage or network usages back to the rules engine 120.

In some embodiments, the rules engine 120 may direct network virtualization operation commands to an orchestration coordination interface module 130. The orchestration coordination interface 130 may be a bi-directional interface module configured to interact with a second orchestrator managing a larger telecommunications network. The rules engine 120 may direct commands and service requests to the second orchestrator via the orchestration coordination interface 130 and receive back AVI type status information about the larger telecommunications network.

In some embodiments, load and overload information may be directed to the virtualization orchestrator 122 from Diameter nodes 136 such as policy and charging rules function (PCRF) plugin modules, cloud management plugins, and/or information collection modules. It should be noted that the diagram as shown in FIG. 1 is provided to explain the subject matter and not as a limitation.

Figure 2:
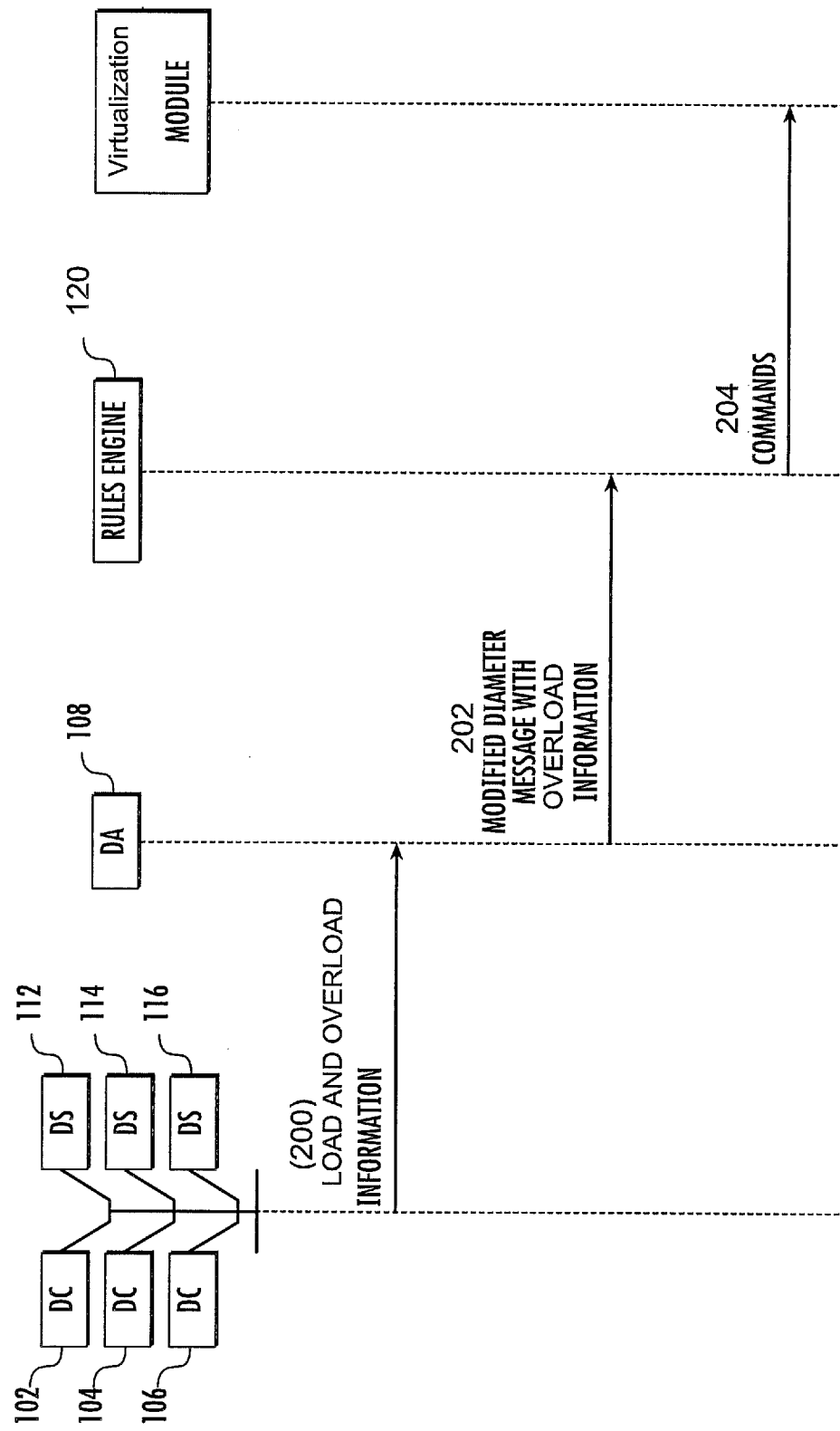
FIG. 2 is a message flow diagram illustrating exemplary messaging for collecting and directing Diameter overload information according to an embodiment of the subject matter described herein.

FIG. 2 is a message flow diagram illustrating exemplary messaging for collecting and directing Diameter overload information according to an embodiment of the subject matter described herein. At line 200, DA 108 receives network load information from DCs 102, 104, 106 and DSs 112, 114, 116. For example, the DA 108 may extract AVP type load information from service messages exchanged between the DCs 102, 104, 106 and the DSs 112, 114, 116.

At line 202, the DA 108 may process the received load information and generate a modified Diameter message which includes Diameter overload information to the rules engine 120 of the virtualization orchestrator 122. In some embodiments, the DA 108 may extract load information and perform a prediction on overload conditions using the load information. For example, the DA 108 may apply an algorithm adapted to aggregate load information received from multiple nodes, or apply an algorithm adapted to average load information for one specific node of a group of nodes, depending on the need of the network.

At line 204, the rules engine 120 may process the received Diameter overload information by applying network operation rules from the rules database 132, coupled with current network state data supplied by the state database 124 and status of the current network topology extracted from the topology database 126, and generate network virtualization operation commands to the telecommunications network. In some embodiments, when network overload has occurred or is imminent, the rules engine can generate service requests to network virtualization modules to reallocate resources to mitigate the effects of overload conditions. Network virtualization modules may bring additional resources online in response to the overload conditions. For example, more gateways, switches, registration nodes may be allocated as needed.

Figure 3:
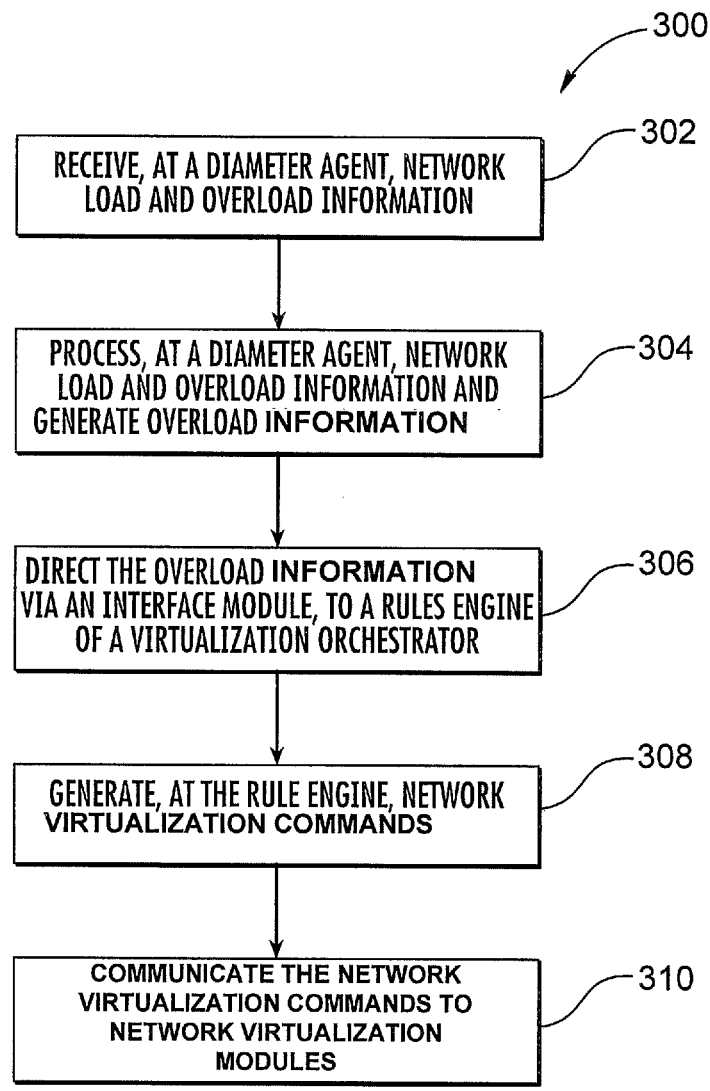
FIG. 3 is a flow chart illustrating an exemplary process for managing overload information according to an embodiment of the subject matter described herein.

FIG. 3 is a flow chart illustrating an exemplary process, generally designated 300, for managing network load and overload information according to an embodiment of the subject matter described herein. Referring to FIG. 3, in block 302, network load and overload information can be received by a Diameter agent 108. For example, DA 108 may facilitate communication between Diameter clines 102-106 and Diameter servers 112-116, DA 108 may route, relay, and/or translate Diameter messages such as service requests or responses between the DCs 102-106 and the DSs 112-116. Furthermore, Diameter messages received by the DA 108 may contain network load information in forms of AVPs located in the payload portions. These AVPs may contain any information for specifying load information or load metrics. Various algorithms may be used to generate load metrics, and some algorithms may generate load metrics that reflect utilization of resources. For example, load metrics may indicate a percentage of resources utilized or available at a Diameter node. In some embodiments, a load AVP may utilize an Unsigned32 data type format and may include a number between 0 and $2^{32}-1$ (4,294,967,295) for representing load, where 0 is "completely unloaded" and 4,294,967,295 is "maximum capacity".

In block 304, the DA 108 can generate overload information from the received load information. For example, load information may be used by the DA 108 to predict overload when load increases and/or spikes, or to determine a rate of load increase when a particular rate triggers some behavior. In some embodiments, signal processing can be applied to load information to detect complex patterns over time and overload conditions may be predicted. The DA 108 may then modify Diameter message by inserting or including Diameter overload information or other related data.

In block 306, overload information may be directed by the DA 108 to a rules engine 120 of a virtualization orchestrator 122. For example, DA 108 may direct a modified diameter message to the rules engine 120, and the message may contain Diameter overload information such as a load AVP in its payload portion. In some embodiments, the modified Diameter message can be transmitted via an interface module. For example, and events interface 118 may be utilized to communicate the message from the DA 108 to the rules engine 120.

In block 308, the rules engine 120 may generate network virtualization operation commands based on the received overload information. In some embodiments, the rules engine 120 may be connected to a rules database 132 which may be configured to provide network provision rules, a state database 124 which monitors and stores network state information, and a topology database 126 which may supply network topology data to the rules engine 120. Network virtualization operation commands can be generated by the rules engine 120 based on the received overload information, coupled with current network topology and state. For example, service requests can be generated to various applications and blocks within the telecommunications network to reallocate resources to mitigate the effects of overload conditions.

In block 310, the rules engine 120 may communicate the virtualization operation commands to network virtualization modules within the telecommunications network. In some embodiments, virtualization operation commands may be directed by the rules engine 120 to a resource manager module, and network topology can be modified accordingly to mitigate the effects of overload conditions. For example, additional gateways and switches can be deployed in response to an imminent network overload, or resources can be reduced when there is an indication in the reduction of network load.

Figure 4:
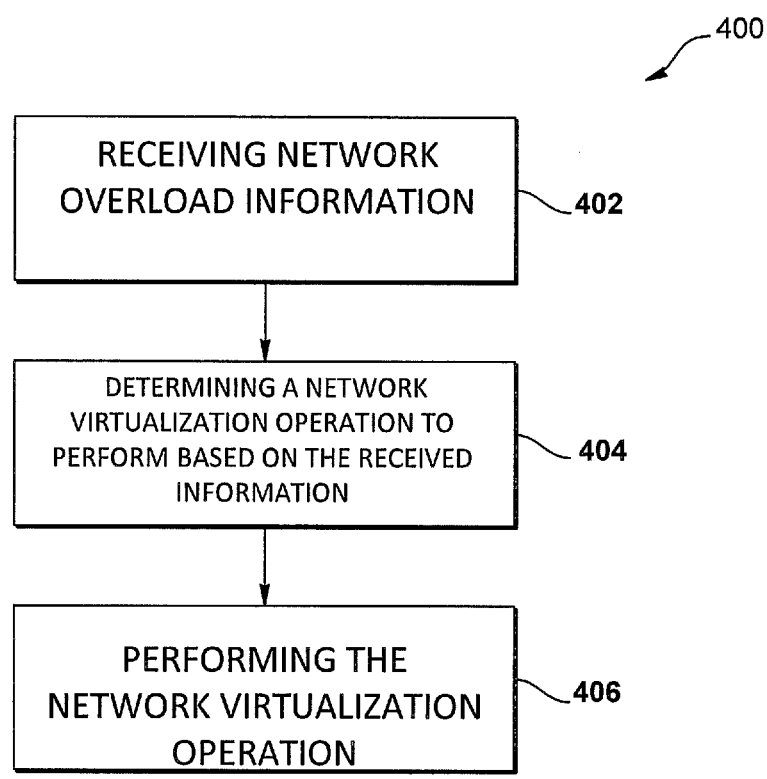
FIG. 4 is a flow chart illustrating an exemplary method for using overload information for managing network virtualization according to an embodiment of the subject matter described herein.

FIG. 4 is a flow chart illustrating an exemplary method, generally designated 400, for using overload information for managing network virtualization according to an embodiment of the subject matter described herein. Referring to FIG. 4, in block 402, overload information may be received by the virtualization orchestrator 122. For example, overload information may be directed by the DA 108 to a rules engine 120 of the virtualization orchestrator 122.

In block 404, the rules engine 120 may determine a network virtualization operation to perform based on the received information. In some embodiments, the rules engine 120 may be connected to a rules database 132 which may be configured to provide network provision rules, a state database 124 which monitors and stores network state information, and a topology database 126 which may supply network topology data to the rules engine 120. Network virtualization operation commands can be generated by the rules engine 120 based on the received overload control information, coupled with current network topology and state information. For example, service requests can be generated for various applications and blocks within the telecommunication network to reallocate resources to mitigate the effects of overload conditions.

In block 406, the determined network operation may be performed by the virtualization orchestrator 122. For example, the rules engine 120 may communicate the virtualization operation commands to network virtualization modules within the telecommunication network. In some embodiments, virtualization operation commands may be directed by the rules engine 120 to a resource manager module, and network topology can be modified accordingly to mitigate the effects of overload conditions. For example, additional gateways and switches can be deployed in response to an imminent network overload, or resources can be reduced when there is an indication in the reduction of network load.

While the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for using overload information for managing network virtualization, the method comprising:
    at a virtualization orchestrator (VO) for managing virtual networks within a telecommunications network and comprising a hardware processor:
    receiving Diameter overload information;
    determining a network virtualization operation to perform based on the received Diameter overload information, wherein determining the network virtualization operation to perform comprises using a rules engine for analyzing the received Diameter overload information and status of a current network topology of the telecommunications network and identifying the network virtualization operation to be performed based on the Diameter overload information and the status of the current network topology; and
    performing the network virtualization operation to direct the telecommunications network to deploy additional resources to mitigate a Diameter overload indicated by the Diameter overload information by deploying, in response to the Diameter overload indicated by the Diameter overload information, one or more additional virtual gateways or one or more additional virtual switches or both in the telecommunications network using one or more network virtualization modules.

2. The method of claim 1 wherein receiving Diameter overload information comprises receiving network load and overload information from a Diameter agent for facilitating communication between a plurality of Diameter clients and a plurality of Diameter servers.

3. The method of claim 2 wherein receiving Diameter overload information comprises receiving information directly from at least one of: a policy and charging rules function (PCRF) plugin module, a cloud management plugin, or an information collection module.

4. The method of claim 1 wherein receiving Diameter overload information comprises receiving information including an attribute value pair (AVP) or a Diameter message.

5. The method of claim 1 wherein determining a network virtualization operation to perform comprises using a state database for maintaining network state information.

6. The method of claim 1 wherein determining a network virtualization operation to perform comprises using information collected from within a telecommunications network.

7. The method of claim 6 wherein using information collected within the telecommunications network comprises using network performance indicators transmitted via a PCRF plugin and wherein performing the network virtualization operation to direct the telecommunications network to deploy additional resources comprises directing commands to the PCRF plugin, which is configured to control topology and provisioning of configuration within the telecommunications network.

8. The method of claim 1 wherein determining a network virtualization operation to perform comprises using information received from an entity external to the telecommunications network.

9. A system for using overload information for managing network virtualization, the system comprising:
    a virtualization orchestrator (VO) for managing virtual networks within a telecommunications network, wherein the VO includes:
        a network interface for receiving Diameter overload information; and
        a rules engine for determining a network virtualization operation based on the received Diameter overload information and for performing the network virtualization operation to direct the telecommunications network to deploy additional resources to mitigate a Diameter overload indicated by the Diameter overload information by deploying, in response to the Diameter overload indicated by the Diameter overload information, one or more additional virtual gateways or one or more additional virtual switches or both in the telecommunications network using one or more network virtualization modules;
    wherein determining the network virtualization operation to perform comprises using the rules engine for analyzing the received Diameter overload information and status of a current network topology of the telecommunications network and identifying the network virtualization operation to be performed based on the Diameter overload information and the status of the current network topology.

10. The system of claim 9 wherein the rules engine performs the network virtualization operation via a network virtualization module.

11. The system of claim 9 wherein the virtualization orchestrator receives the Diameter overload information from a Diameter agent for facilitating communication between a plurality of Diameter clients and a plurality of Diameter servers.

12. The system of claim 9 wherein the Diameter load information comprises information including an attribute value pair (AVP).

13. The system of claim 9 wherein the received Diameter load information comprises a Diameter message.

14. The system of claim 9 wherein the virtualization orchestrator further comprises at least one of: a rules database for providing network virtualization operation rules; a state database for maintaining network state information; and a topology database for maintaining network topology information.

15. The system of claim 9 wherein the rules engine is configured to determine a network virtualization operation using information received from an entity external to the network.

16. The system of claim wherein the rules engine is configured to determine a network virtualization operation using information collected from within the telecommunications network.

17. The system of claim 16 wherein the information collected from within the telecommunications network includes information collected from a PCRF plugin for directing network performance indicators, and wherein performing the network virtualization operation comprises directing commands to the PCRF plugin, which is configured to control topology and provisioning of configuration within the telecommunications network.

18. The system of claim 9 wherein the network virtualization operation comprises one of: assigning at least one additional network resource to a network component, and removing at least one network resource from a network component.

19. A non-transitory computer readable medium having stored thereon computer executable instructions embodied in a computer readable medium and when executed by a processor of a computer performs steps comprising:
   at a virtualization orchestrator (VO) for managing virtual networks within the telecommunications network:
      receiving Diameter overload information;
      determining a network virtualization operation to perform based on the received Diameter overload information, wherein determining the network virtualization operation to perform comprises using a rules engine for analyzing the received Diameter overload information and status of a current network topology of the telecommunications network and identifying the network virtualization operation to be performed based on the Diameter overload information and the status of the current network topology; and
      performing the network virtualization operation to direct the telecommunications network to deploy additional resources to mitigate a Diameter overload indicated by the Diameter overload information by deploying, in response to the Diameter overload indicated by the Diameter overload information, one or more additional virtual gateways or one or more additional virtual switches or both in the telecommunications network using one or more network virtualization modules.

\* \* \* \* \*

UNITED STATES PATENT AND TRADEMARK OFFICE
CERTIFICATE OF CORRECTION

PATENT NO. : 9,537,775 B2  
APPLICATION NO. : 14/034478  
DATED : January 3, 2017  
INVENTOR(S) : McMurry et al.

Page 1 of 1

It is certified that error appears in the above-identified patent and that said Letters Patent is hereby corrected as shown below:

On page 3, Column 2, under Other Publications, Line 2, delete "Authority, of" and insert -- Authority, or --, therefor.

On page 3, Column 2, under Other Publications, Line 14, delete "for" and insert -- of --, therefor.

On page 4, Column 1, under Other Publications, Line 25, delete "Telecummunications" and insert -- Telecommunications --, therefor.

In Column 11, Line 19, in Claim 16, delete "claim" and insert -- claim 10 --, therefor.

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*